3,068,225
Patented Dec. 11, 1962

3,068,225

4-HYDROXY-STEROIDS AND PROCESS OF THEIR PREPARATION

Bruno Camerino, Milan, Bianca Patelli, Stradella, and Roberto Sciaky, Milan, Italy, assignors to Societa Farmaceutici Italia, Milan, Italy, a corporation of Italy No Drawing. Filed Aug. 4, 1961, Ser. No. 129,255
Claims priority, application Italy Oct. 30, 1960
14 Claims. (Cl. 260—239.55)

Our invention relates to a process for obtaining the 4-hydroxy-steroids of the androstane series of 19-nor-androstane, of 17α-hydroxy-pregnane, its 21-hydroxylated derivative, and the new products of said process.

More particularly, our invention refers to the oxidation with oxygen, in the presence of the potassium salt of a t.aliphatic alcohol, of the 3-keto-$\Delta^4$-steroids of the androstane series of 19-nor-androstane, of 17α-hydroxy-pregnane and 17α,21-dihydroxy-pregnane to 4-hydroxy-3-keto-$\Delta^{4,6}$-steroids, from which the corresponding 4-hydroxy-3-keto-$\Delta^4$-steroids are obtained by catalytic hydrogenation of the $\Delta^6$.

In the copending application of Camerino et al., Serial No. 129,478, filed August 4, 1961, entitled "Process for the Manufacture of 4-Hydroxy-3-Keto-$\Delta^4$-Steroids," a process was described and claimed for obtaining the 4-hydroxy-3-keto-$\Delta^4$-steroids (C) of the androstane series of 19-nor-androstane, of 17α-hydroxy-pregnane and 17α, 21-dihydroxy-pregnane, from the corresponding 3-keto-5β-steroids (B), which are obtained by catalytical hydrogenation of the 3-keto-$\Delta^4$-steroids (A), by reaction with oxygen in the presence of the potassium salt of a t.aliphatic alcohol. Although good yields are obtained, this process still involves the reduction of the 3-keto-$\Delta^4$-steroids (A) to the 3-keto-5β-steroids (B), which is not a quantitative reduction owing to the fact that 5α isomers are also always formed, to greater or lesser degree.

We have found, and this is an object of the present invention, that 3-keto-$\Delta^4$-steroids (A) of the androstane series of 19-nor-androstane, 17α-hydroxy-pregnane and the latter's 21-hydroxylated derivative, when treated with oxygen in the presence of the potassium salt of a t.aliphatic alcohol, yield the corresponding 4-hydroxy-3-keto-$\Delta^{4,6}$-steroids (D), from which the relative 4-hydroxy-3-keto-$\Delta^4$-steroids (C) are obtained in very good yield by the catalytic hydrogenation of $\Delta^6$.

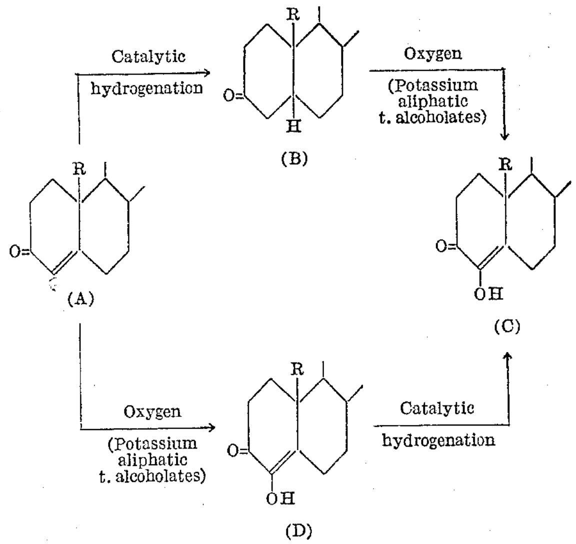

where R=H or $CH_3$.

According to the present invention, 3-keto-$\Delta^4$-steroids of the androstane series of 19-nor-androstane and of 17α-hydroxy-pregnane; the latter having a 17,20,20,21-bis-methylendioxy or substituted bismethylendioxy group when a dioxyacetonic chain is present in C–17 or, but not necessarily, an ethylendioxy group in C–20 when an acetylic chain is present in C–17; are dissolved in t.aliphatic alcohols, such as t.butyl alcohol or t.amyl alcohol and reacted either with oxygen or air in the presence of the potassium salt of a t.aliphatic alcohol, such as potassium t.butylate or potassium t.amylate, at a temperature range between 10° and 50° C., preferably at room temperature for a period of time varying from a few hours to several days.

When the reaction is completed, the reaction mixture is neutralized with acids, such as acetic acid, or diluted inorganic acids, then diluted with water and the steroid subsequently extracted with a usual water-immiscible organic solvent. The resulting crude products, i.e. the 4-hydroxy-3-keto-$\Delta^{4,6}$-steroids, may be isolated in pure form either by crystallization from organic solvents or by chromatography through resins such as Florisil (trademark) and successive elution and crystallization, or may be transformed into the corresponding acylates by acylation of the present primary and secondary hydroxyls with a chloride or anhydride of an acid in the presence or absence of t.amines, or converted into the corresponding 4-hydroxy-3-keto-$\Delta^4$-steroids by catalytic hydrogenation of the $\Delta^6$. The protecting groups of the side chain in C–17, eventually present, of the 4-hydroxy-3-keto-$\Delta^{4,6}$-steroids obtained after oxidation may be removed before or after the acylation of the C–4 hydroxyl or the hydrogenation of the $\Delta^6$.

The present invention refers to the process for obtaining 4-hydroxy-3-keto-$\Delta^{4,6}$-steroids from the 3-keto-$\Delta^4$-steroids. The process may be carried out with either atmospheric oxygen or pure oxygen. The air or oxygen may either be blown into the solution, in which case any carbon dioxide and moisture, if present, are preferably removed, or reacted on the surface as by allowing the solution of the steroid to stand in large and open containers.

The molar ratio of potassium t.alcoholate to steroid may vary from 1 to 30, preferably between 5 and 10. Yields are approximately of 50–90%.

The transformation of the 4-hydroxy-3-keto-$\Delta^{4,6}$-steroids into 4-hydroxy-3-keto-$\Delta^4$-steroids is carried out by hydrogenation in the presence of catalysts, such as 5–10% palladium over charcoal or platinum dioxide to absorb one mole of hydrogen, at room temperature and pressure followed by purification according to the techniques stated above with respect to the $\Delta^{4,6}$-steroids. The yields of the selective hydrogenation of the double bond in 6-7 position are practically quantitative.

4-hydroxy-testosterone (II), 4,11β-dihydroxy-17α-methyl-testosterone (IV), 4-hydroxy-17α-methyl-testosterone (VI), 4-hydroxy-19-nortestosterone (VIII), 4-hydroxy-cortisone (X), 4-hydroxy-hydrocortisone (XII), 4, 17α-dihydroxy-progesterone (XIV), and the corresponding $\Delta^6$ analogues and the derivatives thereof were prepared according to the present process.

As far as it is known, among the group of the 4-hydroxy-3-keto-$\Delta^{4,6}$-steroids only the $\Delta^6$- and the $\Delta^{1,6}$-4-hydroxy-(or 4-acyloxy)-17α-methyl-testosterones, showing a high anabolic activity when administered orally, have been described (Camerino et al. application Serial No. 79,960, filed January 3, 1961).

The 4-hydroxy-3-keto-$\Delta^{4,6}$-steroids obtained according to the present process are useful because the therapeutically useful corresponding 4-hydroxy-3-keto-$\Delta^4$-steroids are obtained from them and because they also possess interesting hormonal properties.

The invention is described in the following examples which serve to illustrate said invention but not to limit it in any way.

EXAMPLE 1

*$\Delta^{4,6}$-Androstadiene-4,17β-Diol-3-One (I)*

1 g. of testosterone is dissolved in 40 cc. of t.butyl alcohol. A solution of potassium t.butylate, which is prepared by dissolving 450 mg. of potassium in 15 cc. of t.butyl alcohol, is added to the testosterone solution. The reaction mixture is left standing at room temperature for 24 hrs. and is occasionally stirred. Thereafter 1 cc. of $CH_3COOH$ is added, the solution is diluted with ethyl acetate, then poured into a saturated aqueous solution of sodium chloride. The organic layer is separated, washed to neutrality with $H_2O$, dried on $Na_2SO_4$ and evaporated to dryness. The residue is dissolved in benzene, filtered and chromatographically separated through 20 g. of Florisil. By using benzene and mixtures of benzene-ether 9:1 (in volume), a product is eluted which is slightly soluble in ether and crystallizes from methanol and afterward from acetone, melting at 210–215° C.; $\lambda_{max}$ at 318 mμ; ε=21,200; and red-violet coloration with $FeCl_3$. This is $\Delta^{4,6}$-androstadiene-4,17β-diol-3-one (I).

EXAMPLE 1A

*4,17-Diacetate of $\Delta^{4,6}$-Androstadiene-4,17β-Diol-3-One*

25 mg. of $\Delta^{4,6}$-androstadiene-4,17β-diol-3-one (I) are dissolved in 0.2 cc. of pyridine and acetylated with 0.06 cc. of acetic anhydride for 1 hour on a boiling water-bath. Dilution with $H_2O$ causes the product to precipitate which is filtered off, washed with water, dried and recrystallized from acetone-petroleum ether.

This is the 4,17-diacetate of I melting at 150–153° C.; $\lambda_{max}$ at 288 mμ; ε=22,600.

EXAMPLE 2

*4-Hydroxy-Testosterone (II) From I*

25 mg. of $\Delta^{4,6}$-androstadiene-4,17β-diol-3-one are dissolved in 2 cc. of anhydrous ethyl alcohol and hydrogenated at room temperature and pressure, in the presence of 2 mg. of $PtO_2$; the reaction is stopped when one mole of hydrogen is absorbed. The catalyst is filtered off and the solution evaporated to dryness; the semicrystalline residue melts at 190–215° C. and has an U.V. absorption maximum at 278 mμ. By crystallizing from acetone-petroleum ether, II is obtained in pure form, M.P.=221–223° C.

EXAMPLE 3

*17α-Methyl-$\Delta^{4,6}$-Androstadiene-4,11β,17β-Triol-3-One (III)*

A solution of potassium t.butylate, prepared from 450 mg. of potassium and 15 cc. of t.butyl alcohol, is added to 1 g. of 11β-hydroxy-17α-methyl-testosterone dissolved in 40 cc. of t.butyl alcohol. The reaction is kept at room temperature for 24 hrs. with occasional stirring. 1 cc. of $CH_3COOH$ is then added to the solution, which is sequentially diluted with ethyl acetate, and poured into a saturated aqueous solution of sodium chloride. The organic layer is separated, washed with 5% aqueous solution of $Na_2CO_3$ and with water to neutrality. The product is dried on anhydrous $Na_2SO_4$ and evaporated to dryness. The residue is dissolved in benzene, filtered and chromatographically separated through 30 g. of Florisil. Elution from the column with benzene and with mixtures of benzene-ether 9:1 and 8:2 (in volume) produces a product which is slightly soluble in ether and melts at 190–200° C. when recrystallized from acetone-ether; $\lambda_{max}$ at 318 mμ. The product gives a red-violet coloration with $FeCl_3$. This is 17α-methyl-$\Delta^{4,6}$-androstadiene-4,11β,17β-triol-3-one (III).

EXAMPLE 4

*4,11β-Dihydroxy-17α-Methyl-Testosterone (IV) From III*

The hydrogenation of 17α-methyl-$\Delta^{4,6}$-androstadiene-4,11β,17β,triol-3-one (III), in the presence of 10% palladium over charcoal, at room temperature and pressure with absorption of one mole of hydrogen, yields 4,11β-dihydroxy-17α-methyl-testosterone (IV), melting at 184–186° C.

EXAMPLE 5

*17α-Methyl-$\Delta^{4,6}$-Androstadiene-4,17β-Diol-3-One (V)*

5 g. of 17α-methyl-testosterone dissolved in 200 cc. of t.butyl alcohol and 75 cc. of t.butyl alcohol, wherein 2.25 g. of potassium were dissolved, are left together in an open flask at room temperature overnight. The mixture is acidified with acetic acid and extracted with ethyl acetate. The extract is washed with a saturated NaCl solution, then with 10% sodium bicarbonate solution and finally with water to neutrality. After evaporation of the solvent, a residue of 4.900 g. is obtained which is chromatographically purified through Florisil. From the eluted fractions with benzene and ether-benzene in 9:1 volume ratio, 17α-methyl-$\Delta^{4,6}$-androstadiene-4,17β-diol-3-one (V), which melts at 209–211° C., crystallizes out.

EXAMPLE 6

*4-Hydroxy-17α-Methyl-Testosterone (VI) From V*

1 g. of 17α-methyl-$\Delta^{4,6}$-androstadiene-4,17β-diol-3-one (V) are dissolved in 50 cc. of anhydrous ethyl alcohol and hydrogenated at room temperature and pressure in the presence of 25 mg. of 10% palladium over charcoal. After absorption of one mole of hydrogen, the hydrogenation speed decreases remarkably; then the reaction is stopped, the catalyst filtered off, and the solution evaporated to dryness under vacuum. The crude product has an U.V. absorption maximum at 278 mμ. The crude product is dissolved in chloroform, then passed through a column of Florisil with sequential elution with chloroform; the chloroformic eluates are evaporated to dryness and the crystalline residue is pulped with a mixture of ether and petroleum ether. The product is thereafter filtered and dried to obtain the 4-hydroxy-17α-methyl-testosterone (VI) melting at 170–172° C.

EXAMPLE 7

*19-Nor-$\Delta^{4,6}$-Androstadiene-4,17β-Diol-3-One (VII)*

3 g. of 19-nor-testosterone are dissolved in 120 cc. of t. butyl alcohol. A solution of potassium t.butylate prepared from 1350 mg. of potassium and 45 cc. of t.butyl alcohol is added to the 19-nor-testosterone solution. The mixture is permitted to react for 15 hrs. at room temperature with occasional stirring. The product is acidified with 3 cc. of acetic acid, diluted with ethyl acetate and poured into an aqueous saturated NaCl solution. The extract is then separated, washed with 5% solution of $Na_2CO_3$ and with $H_2O$ to neutrality. It is then dried on anhydrous $Na_2SO_4$ and evaporated to dryness. The residue is dissolved in benzene and chromatographically purified through 50 g. of Florisil. Eluting with mixtures of benzene-ether 9:1 (in volume), a product is obtained which when recrystallized from acetone-ether melts at 195–200° C.; $\lambda_{max}$ at 316 mμ; ε=18,600. The product gives a red-violet coloration with $FeCl_3$. This is the 19-nor-$\Delta^{4,6}$-androstadiene-4,17β-diol-3-one (VII).

EXAMPLE 8

*4-Hydroxy-19-Nor-Testosterone (VIII) From VII*

By hydrogenation of the 19-nor-$\Delta^{4,6}$-androstadiene-4,17β-diol-3-one (VII), in the presence of 10% palladium over charcoal and at room temperature to absorption of one mole of hydrogen, the 4-hydroxy-19-nor-testtosterone (VIII) is obtained (M.P. 187–189° C.).

EXAMPLE 9

*$\Delta^{4,6}$-Pregnadiene-4-Ol-3,11-Dione-17α,20,20,21-Bis-methylene-Dioxy (IX)*

15 cc. of t.butyl alcohol containing 0.450 g. of potassium are added to 1 g. of cortisone-17,20,20,21-bismethylenedioxy suspended in 50 cc. of t.butyl alcohol. The product is left at room temperature overnight and dissolves during reaction. When acidification with acetic acid is over, the solution is extracted with ethyl acetate. The extract is then washed with a saturated salt (NaCl) solution, then with a solution of 10% sodium bicarbonate and finally with water to neutrality. After distillation of the solvent, the residue (0.900 g.) is crystallized from methylene chloride-methanol. $\Delta^{4,6}$-pregnadiene-4-ol-3, 11 - dione - 17α,20,20,21-bismethylenedioxy is obtained (M.P.=310–315° C.; $\lambda_{max}$ at 318 mμ; ε=20,300).

EXAMPLE 9A

*4-Acetate of $\Delta^{4,6}$-Pregnadiene-4-Ol-3,11-Dione-17α,20,20,21-Bismethylenedioxy*

250 mg. of the preceding product dissolved in 3 cc. of pyridine are acetylated at room temperature for 12 hrs. with 0.75 cc. of acetic anhydride. The corresponding 4-acetate melting at 195–197° C is isolated in the known manner.

EXAMPLE 9B

*$\Delta^{4,6}$-Pregnadiene-4,17α,21-Triol-3,11,20-Trione (IX)*

200 mg. of $\Delta^{4,6}$-pregnadiene-4-ol-3,11-dione-17α,20,20,21-bismethylenedioxy are heated for two hours at 100° C. in 20 cc. of 60% aqueous formic acid to obtain at the end $\Delta^{4,6}$-pregnadiene-4,17α,21-triol-3,11,20-trione (IX) melting at 203–205° C.; $\lambda_{max}$ at 318 mμ; ε=22,500.

EXAMPLE 10

*4-Hydroxy-Cortisone (X) From IX*

By hydrogenation of the $\Delta^{4,6}$-pregnadiene-4,17α,21-triol-3,11,20-trione (IX), in the presence of 10% palladium over charcoal, at room temperature and pressure to absorption of one mole of hydrogen, 4-hydroxy-cortisone (X) is obtained (M.P.=215–218° C.).

EXAMPLE 11

*$\Delta^{4,6}$-Pregnadiene-4-11β-Diol-3-One-17α,20,20,21-Bis-methylene-dioxy*

5 g. of hydrocortisone 17,0,20,21-bismethylene-dioxy, when treated with potassium in t.butyl alcohol as described in Example 9, yield 4.5 g. of crude product which are crystallized from methylene chloride-methanol. This is the $\Delta^{4,6}$-pregnadiene-4,11β-diol-3-one-17α,20,20,21-bis-methylenedioxy melting at 288–290° C.; $\lambda_{max}$ at 318 mμ; ε=20,670.

EXAMPLE 11A

*$\Delta^{4,6}$-Pregnadiene-4,11β,17α,21-Tetrol-3,20-Dione (XI)*

250 mg. of the preceding product are heated for two hours at 100° C. in 20 cc. of 60% aqueous formic acid and yield $\Delta^{4,6}$-pregnadiene-4,11β,17α,21-tetrol-3,20-dione (XI) melting at 218–220° C.; $\lambda_{max}$ at 318 mμ; ε=22,800.

EXAMPLE 12

*4-Hydroxy-Hydrocortisone (XII) From XI*

The 4-hydroxy-hydrocortisone (XII) is obtained by hydrogenation of $\Delta^{4,6}$-pregnadiene-4,11β,17α,21-tetrol-3,20-dione (XI), in the presence of $PtO_2$ and at room temperature and pressure by absorption of one mole of hydrogen (M.P.=205–208° C.).

EXAMPLE 13

*$\Delta^{4,6}$-Pregnadiene-4,17α-Diol-3-One-20-Ethylene-Glycol-Ketal-4-Acetate*

5 g. of 17α-hydroxy-progesterone-20-ethylene-glycol ketal are treated with potassium in t.butyl alcohol as described in Example 9. After extraction with ethyl acetate and distillation of the solvent, 4.3 g. of crude product remain which are acylated with pyridine and acetic anhydride. The acylated product is chromatographically purified through Florisil. From the eluted fractions with benzene the $\Delta^{4,6}$-pregnadiene-4,17α-diol-3-one-20-ethylene-glycol-ketal-4-acetate crystallized, melting at 208–210° C.; $\lambda_{max}$ 290 mμ; ε=22,510.

EXAMPLE 13A

*$\Delta^{4,6}$-Pregnadiene-4,17α-Diol-3,20-Dione (XIII)*

0.200 g. of the product of Example 13 are heated for 2 hours at 100° C. in 20 cc. of 60% aqueous formic acid to yield $\Delta^{4,6}$-pregnadiene-4,17α-diol-3,20-dione (XIII) melting at 263–265° C.; $\lambda_{max}$ at 318 mμ; ε=23,760.

EXAMPLE 14

*4,17α-Dihydroxy-Progesterone (XIV) From XIII*

By hydrogenation of the $\Delta^{4,6}$-pregnadiene-4,17α-diol-3,20-dione (XIII), in the presence of 10% palladium over charcoal and at room temperature and pressure by absorption of one mole of hydrogen, 4,17α-dihydroxy-progesterone (XIV), melting at 228–230° C., is obtained.

We claim:

1. A process for preparing 4-hydroxy-3-keto-$\Delta^{4,6}$-steroids having the following formula:

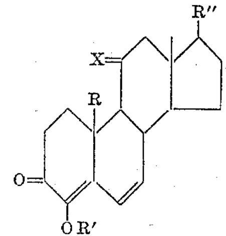

wherein X is selected from the group consisting of $H_2$, H(OH) and O;
R is selected from the group consisting of H and $CH_3$;
R'' is selected from the group consisting of

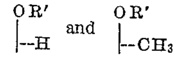

when R is selected from the group consisting of H and $CH_3$;
R'' is selected from the group consisting of

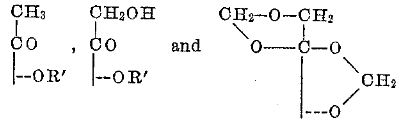

When R is $CH_3$; and
R' is selected from the group consisting of H and —$COCH_3$
which comprises reacting the corresponding 3-keto-$\Delta^4$-steroid, in a t.aliphatic alcohol medium in the presence of the potassium salt of a t.aliphatic alcohol, with an oxygen-containing gas and purifying the resultant 4-hydroxy-3-keto-$\Delta^{4,6}$-steroids.

2. A process for preparing 4-hydroxy-3-keto-$\Delta^{4,6}$-steroids having the formula of claim 1, which comprises reacting the corresponding 3-keto-$\Delta^4$-steroids, in a t.aliphatic alcohol medium in the presence of the potassium salt of a t.aliphatic alcohol, with an oxygen-containing gas and acetylating the resultant 4-hydroxy-3-keto-$\Delta^{4,6}$-steroids.

3. A process for preparing 4-hydroxy-3-keto-$\Delta^{4,6}$-steroids having the formula of claim 1, which comprises reacting the corresponding 3-keto-$\Delta^4$-steroid, in a t.aliphatic alcohol medium in the presence of the potassium salt of a t.aliphatic alcohol, with an oxygen-containing gas and catalytically hydrogenating the resultant 4-hydro-3-keto-$\Delta^{4,6}$-steroids into the corresponding 4-hydroxy-3-keto-$\Delta^4$- steroid, by a catalyst selected from the group consisting of 5–10% palladium over charcoal and platinum dioxide.

4. A process for preparing 4-hydroxy-3-keto-$\Delta^{4,6}$-steroids having the formula of claim 1, which comprises reacting the corresponding 3-keto-$\Delta^{4}$-steroid, in a medium comprising a t.aliphatic alcohol selected from the group consisting of t.butyl alcohol and t.amyl alcohol, in the presence of the potassium salt of a t.aliphatic alcohol selected from the group consisting of t.butyl alcohol and t.amyl alcohol, with air, said air being blown into the solution after removal of any carbon dioxide and moisture that may be present in said air, at a temperature between 10° C. and 50° C., and purifying the resultant 4-hydroxy-3-keto-$\Delta^{4,6}$-steroid.

5. A process for preparing 4-hydroxy-3-keto-$\Delta^{4,6}$-steroids having the formula of claim 1, which comprises reacting the corresponding 3-keto-$\Delta^{4}$-steroid, in a medium comprising a t.aliphatic alcohol selected from the group consisting of t.butyl alcohol and t.amyl alcohol, in the presence of the potassium salt of a t.aliphatic alcohol selected from the group consisting of t.butyl alcohol and t.amyl alcohol, with air, said air being blown into the solution after removal of any carbon dioxide and moisture that may be present in said air, at a temperature between 10° C. and 50° C., acetylating the resultant 4-hydroxy-3-keto-$\Delta^{4,6}$-steroid and hydrogenating in the presence of a hydrogen catalyst selected from the group consisting of 5–10% palladium over charcoal and platinum dioxide to produce the corresponding 4-hydroxy-3-keto-$\Delta^{4}$-steroid.

6. 17$\alpha$-methyl-$\Delta^{4,6}$-androstadiene-4,11$\beta$,17$\beta$-triol-3-one.

7. $\Delta^{4,6}$-pregnadiene-4,17$\alpha$,21-triol-3,11,20-trione.

8. $\Delta^{4,6}$-pregnadiene-4-ol-3,11-dione - 17$\alpha$,20,20,21 - bismethylenedioxy.

9. $\Delta^{4,6}$-pregnadiene-4-ol-3,11-dione - 17$\alpha$,20,20,21 - bismethylenedioxy-4-acetate.

10. $\Delta^{4,6}$-pregnadiene-4,11$\beta$,17$\alpha$,21-tetrol-3,20-dione.

11. $\Delta^{4,6}$-pregnadiene-4,11$\beta$-diol-3-one-17$\alpha$,20,20,21-bismethylenedioxy.

12. $\Delta^{4,6}$-pregnadiene-4,17$\alpha$-diol-3,20-dione.

13. $\Delta^{4,6}$-pregnadiene-4,17$\alpha$-diol - 3 - one - 20 - ethyleneglycol-ketal.

14. 4-hydroxy-3-keto-$\Delta^{4,6}$-steroids having the following structural formula:

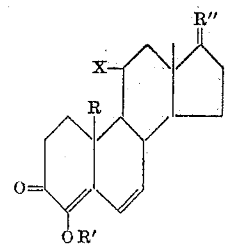

Wherein R is selected from the group consisting of H and $CH_3$;

R'' is selected from the group consisting of

OR'
|---H and

OR'
|---$CH_3$ when R is H and X is selected from the group consisting of $\beta$(H)OH and O;

R'' is selected from the group consisting of

OR'
|---H and

OR'
|---$CH_3$ when R is $CH_3$ and X is selected from the group consisting of $\beta$(H)OH and O;

R'' is selected from the group consisting of

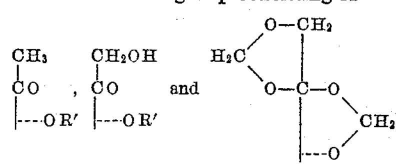

when R is $CH_3$ and X is selected from the group consisting of $\beta$H(OH) and O; and R' is selected from the group consisting of H and $COCH_3$.

References Cited in the file of this patent

UNITED STATES PATENTS

| | | |
|---|---|---|
| 2,340,388 | Inhoffen et al. | Feb. 1, 1944 |
| 2,738,348 | Colton | Mar. 13, 1956 |

UNITED STATES PATENT OFFICE

CERTIFICATE OF CORRECTION

Patent No. 3,068,225 December 11, 1962

Bruno Camerino et al.

It is hereby certified that error appears in the above numbered patent requiring correction and that the said Letters Patent should read as corrected below.

In the heading to the printed specification, line 9, for "Claims priority, application Italy Oct. 30, 1960" read -- Claims priority, application Italy Oct. 3, 1960 --.

Signed and sealed this 21st day of May 1963.

(SEAL)
Attest:

ERNEST W. SWIDER
Attesting Officer

DAVID L. LADD
Commissioner of Patents